US012217901B2

(12) United States Patent
Honda

(10) Patent No.: US 12,217,901 B2
(45) Date of Patent: Feb. 4, 2025

(54) COIL COMPONENT

(71) Applicant: Murata Manufacturing Co., Ltd., Kyoto-fu (JP)

(72) Inventor: Hiroyuki Honda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 690 days.

(21) Appl. No.: 17/540,119

(22) Filed: Dec. 1, 2021

(65) Prior Publication Data

US 2022/0181074 A1 Jun. 9, 2022

(30) Foreign Application Priority Data

Dec. 9, 2020 (JP) ................................ 2020-204053

(51) Int. Cl.
*H01F 27/29* (2006.01)
*H01F 17/04* (2006.01)
*H01F 27/28* (2006.01)

(52) U.S. Cl.
CPC ......... *H01F 27/292* (2013.01); *H01F 17/045* (2013.01); *H01F 27/2823* (2013.01); *H01F 2017/048* (2013.01)

(58) Field of Classification Search
CPC ................ H01F 27/292; H01F 17/045; H01F 27/2823; H01F 2017/048; H01F 41/069; H01F 2017/0093; H01F 27/2828; H01F 27/306; H01F 5/00; H01F 27/29; H01F 27/323
See application file for complete search history.

(56) References Cited

U.S. PATENT DOCUMENTS

| | | | | |
|---|---|---|---|---|
| 6,027,008 | A | 2/2000 | Toi et al. | |
| 6,119,924 | A * | 9/2000 | Toi | B23K 20/023 228/179.1 |
| 6,552,642 | B1 * | 4/2003 | Toi | H01F 27/292 336/200 |
| 2019/0244744 | A1 | 8/2019 | Takenaka et al. | |
| 2024/0047121 | A1 * | 2/2024 | Takenaka | H01F 17/04 |

FOREIGN PATENT DOCUMENTS

| | | | | | |
|---|---|---|---|---|---|
| JP | H10-312922 | A | | 11/1998 | |
| JP | H11-283857 | A | | 10/1999 | |
| JP | 2019-135763 | A | | 8/2019 | |
| JP | 2019135758 | A | * | 8/2019 | H01L 24/45 |

* cited by examiner

*Primary Examiner* — Tuyen T Nguyen
(74) *Attorney, Agent, or Firm* — Studebaker & Brackett PC

(57) ABSTRACT

A coil component comprising a wire including the core wire made of copper or a copper alloy and an insulating coating film made of resin that covers a peripheral surface of the core wire, and a terminal electrode including a nickel-containing layer made of nickel or a nickel alloy and covering a bottom surface of a flange portion, and a tin-containing layer located on the nickel-containing layer and made of tin or a tin alloy. The terminal of the core wire has a contact surface in contact with the nickel-containing layer, side surfaces extending in a direction rising from the nickel-containing layer, and a top surface facing the contact surface. The side surfaces have a region not in contact with the tin-containing layer at least on a top surface side. In the region, copper of the core wire is not diffused into the tin-containing layer.

20 Claims, 4 Drawing Sheets

COIL COMPONENT

CROSS-REFERENCE TO RELATED APPLICATION

This application claims benefit of priority to Japanese Patent Application No. 2020-204053 filed Dec. 9, 2020, the entire content of which is incorporated herein by reference.

BACKGROUND

Technical Field

The present disclosure relates to a winding-type coil component having a structure in which a wire is wound around a winding core portion, and particularly relates to a connection structure between a wire and a terminal electrode.

Background Art

As a technique of interest for the present disclosure, for example, there is a technique described in Japanese Patent Application Laid-Open No. 10-312922. Japanese Patent Application Laid-Open No. 10-312922 describes a coil component having a structure in which a wire and a terminal electrode are connected by thermocompression bonding. FIG. 9 is cited from Japanese Patent Application Laid-Open No. 10-312922 and corresponds to FIG. 1(C) in Japanese Patent Application Laid-Open No. 10-312922. In FIG. 9, a part of one flange portion 2 included in a core 1 is shown in section.

As shown in FIG. 9, a terminal electrode 4 is provided on a bottom surface 3 facing the mounting surface side of the flange portion 2. The terminal electrode 4 includes, for example, a good conductive material layer 5 made of silver, a silver alloy, or the like, a solder resistant material layer 6 made of nickel or the like on the good conductive material layer 5, and a solder affinity material layer 7 made of tin, a tin alloy, or the like on the solder resistant material layer 6. Although not shown, the wire includes a core wire made of copper or a copper alloy and an insulating coating film made of resin that covers the peripheral surface thereof. In FIG. 9, a terminal 8 of the core wire of the wire wound around a winding core portion (not shown) is connected to the terminal electrode 4 by thermocompression bonding.

In a step of performing thermocompression bonding described above, the terminal 8 of the core wire of the wire is arranged on the terminal electrode 4, and in this state, the terminal 8 of the core wire is pushed toward the terminal electrode 4 by a heater chip (not shown). As a result, the terminal 8 of the core wire is crushed so that its section is flat, and is embedded up to a position substantially flush with the surface of the solder affinity material layer 7. In this way, a desired bonding state is obtained between the terminal 8 of the core wire and the terminal electrode 4.

SUMMARY

With changes in requirement specifications such as the progress in miniaturization of the core, in diversification of the wire diameter (thickening and thinning), in higher heat resistance of the insulating coating film of the wire, and the like and the increase in load of the reliability test, it has been found that a desired connection state may not be obtained even if the terminal 8 of the core wire and the terminal electrode 4 are connected by thermocompression bonding as described in Japanese Patent Application Laid-Open No. 10-312922 described above. For example, there have been a bonding failure between the terminal 8 of the core wire and the terminal electrode 4, and a disconnection of the core wire near the terminal electrode 4.

It should be noted that a coil component normally includes at least two terminal electrodes, and a terminal of a wire is connected to each of the terminal electrodes. Therefore, although it is ideal that the above-described problem is solved for connection between all the terminal electrodes and the terminals of wires, even if the problem is solved only for connection between one terminal electrode and one terminal of a wire, it should be considered that improvement is made toward solving the problem as compared with a case where no problem is to be solved.

Therefore, the present disclosure provides a coil component in which a bonding failure between a terminal of a core wire of a wire and a terminal electrode is less likely to occur and disconnection of the core wire is less likely to occur.

The present disclosure is directed toward a coil component including a core including a winding core portion extending in an axial direction, and a first flange portion and a second flange portion respectively provided at a first end and a second end opposite to each other in the axial direction of the winding core portion; a first terminal electrode provided in the first flange portion; a second terminal electrode provided in the second flange portion; and at least one wire wound around the winding core portion. The at least one wire includes a core wire made of copper or a copper alloy and an insulating coating film made of resin covering a peripheral surface of the core wire.

The core wire of the wire includes a first terminal electrically connected to the first terminal electrode and a second terminal electrically connected to the second terminal electrode.

Each of the first flange portion and the second flange portion has a bottom surface facing a mounting surface side.

Each of the first terminal electrode and the second terminal electrode includes a nickel-containing layer made of nickel or a nickel alloy, the nickel-containing layer being provided to cover the bottom surface of each of the first flange portion and the second flange portion, and a tin-containing layer made of tin or a tin alloy located on the nickel-containing layer.

Each of the first terminal and the second terminal includes a contact surface in contact with the nickel-containing layer, a pair of side surfaces adjacent to the contact surface, the pair of side surfaces extending in a direction rising from the nickel-containing layer, and a top surface adjacent to the side surfaces, the top surface facing the contact surface.

In the present disclosure, since tin included in the tin-containing layer in the terminal electrode and copper included in the core wire of the wire form an alloy, attention is paid to a phenomenon in which the core wire of the wire is thinned due to diffusion of copper on the wire side into the tin-containing layer of the terminal electrode at a high temperature during thermocompression bonding, for example. Therefore, the side surfaces of at least one of the first terminal and the second terminal have a region not in contact with the tin-containing layer at least on a top surface side.

According to the present disclosure, since the side surface of the terminal of the core wire of the wire has the region not in contact with the tin-containing layer in the terminal electrode at least on the top surface side, diffusion of copper into the tin-containing layer does not occur at least in the region not in contact with the tin-containing layer in the terminal of the core wire. Therefore, for example, inconvenience can be made less likely to occur such as copper contained in the core wire being diffused into the tin-containing layer in the terminal electrode over the whole side surface of the core wire by heat applied at the time of thermocompression bonding or at the time of use of the coil component in a high-temperature environment, and the core wire being thinned. Therefore, a bonding failure between the terminal of the core wire of the wire and the terminal electrode and disconnection of the core wire can be made less likely to occur.

DETAILED DESCRIPTION

Figure 1:
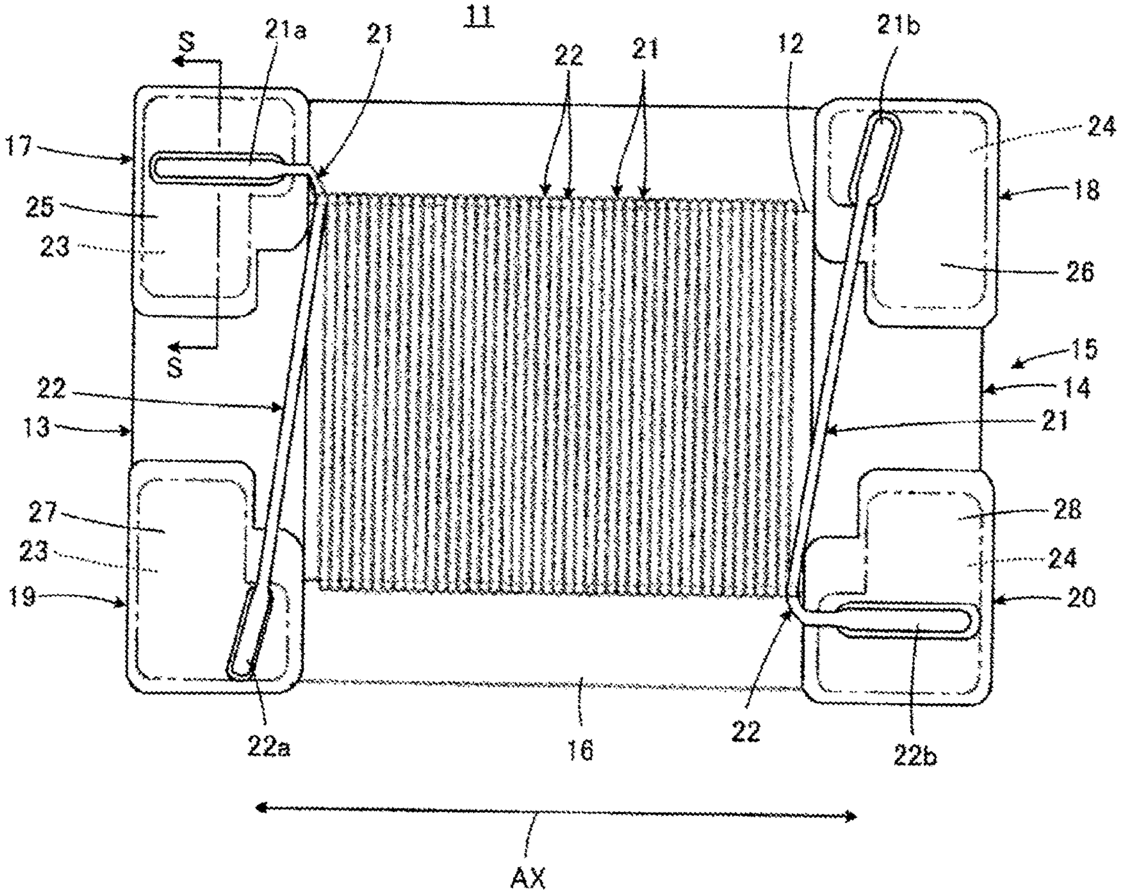
FIG. 1 is a bottom view of a coil component according to a first embodiment of the present disclosure.
Figure 2:
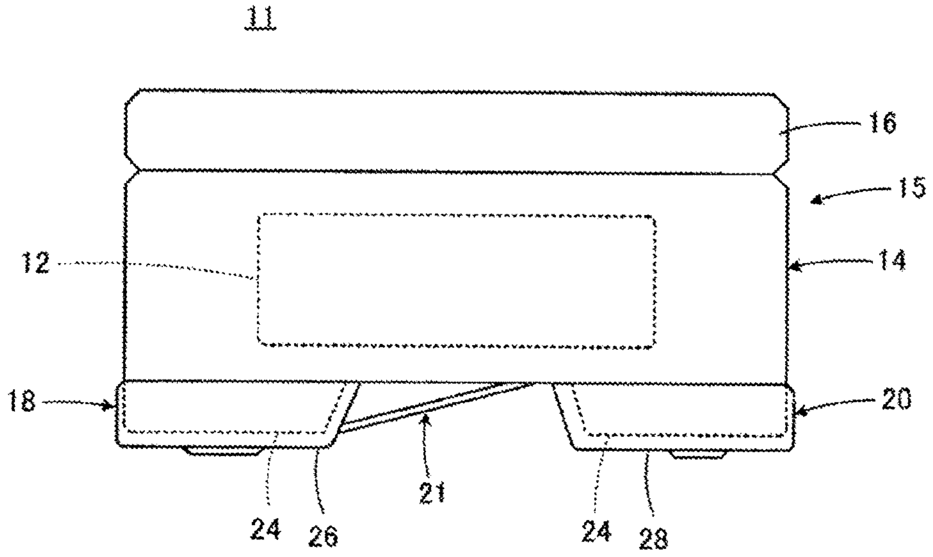
FIG. 2 is a right side view of the coil component shown in FIG. 1.

Referring to FIGS. 1 and 2, a coil component 11 constitutes, for example, a common mode choke coil, and includes a core 15 including a winding core portion 12 extending in an axial direction AX, and a first flange portion 13 and a second flange portion 14 respectively provided at a first end and a second end opposite to each other in the axial direction AX of the winding core portion 12. For example, the core 15 has a dimension of about 3.2 mm in the axial direction AX, a dimension of about 2.5 mm in a width direction (vertical direction in FIG. 1) orthogonal to the axial direction, and a dimension of about 1.5 mm in a height direction (direction orthogonal to the paper surface in FIG. 1). The core 15 is made of a non-conductive material such as alumina or ferrite.

The coil component 11 further includes a top plate 16 that connects the pair of flange portions 13 and 14 included in the core 15. When both the core 15 and the top plate 16 are made of a magnetic material, the top plate 16 can constitute a closed magnetic path around which a magnetic flux circles in cooperation with the core 15.

The first flange portion 13 is provided with a first terminal electrode 17 and a third terminal electrode 19. The second flange portion 14 is provided with a second terminal electrode 18 and a fourth terminal electrode 20.

Figure 3:
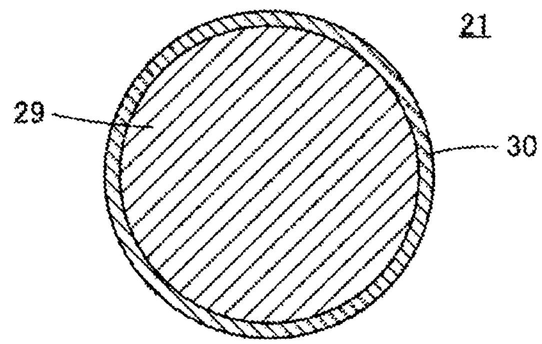
FIG. 3 is an enlarged view schematically showing a section of a wire.

A first wire 21 and a second wire 22 are wound around the winding core portion 12 in directions identical to each other. As shown in an enlarged section of the first wire 21 in FIG. 3, the first wire 21 and the second wire 22 include a core wire 29 made of copper or a copper alloy and an insulating coating film 30 made of a resin such as imide-modified polyurethane covering a peripheral surface of the core wire 29. As the wires 21 and 23, for example, those having a diameter of the core wire 29 of 0.030 mm and a thickness of the insulating coating film 30 of 0.010 mm are used.

As shown in FIG. 1, the core wire 29 of the first wire 21 includes a first terminal 21*a* electrically connected to the first terminal electrode 17 and a second terminal 21*b* electrically connected to the second terminal electrode 18. The core wire 29 of the second wire 22 includes a third terminal 22*a* electrically connected to the third terminal electrode 19 and a fourth terminal 22*b* electrically connected to the fourth terminal electrode 20.

The first flange portion 13 has a first bottom surface 23 facing the mounting surface side. The second flange portion 14 has a second bottom surface 24 facing the mounting surface side.

The first terminal electrode 17 is provided on the first bottom surface 23 and is provided so as to extend from the first bottom surface 23 to a part of each of a plurality of surfaces adjacent thereto. The second terminal electrode 18 is provided on the second bottom surface 24 and is provided so as to extend from the second bottom surface 24 to a part of each of a plurality of surfaces adjacent thereto. The first terminal electrode 17 has a first main surface 25 extending along the first bottom surface 23. The second terminal electrode 18 has a second main surface 26 extending along the second bottom surface 24.

The third terminal electrode 19 is provided on the first bottom surface 23 in a state of being separated from the first terminal electrode 17 by a predetermined interval, and is provided so as to extend from the first bottom surface 23 to a part of each of the plurality of surfaces adjacent thereto. The fourth terminal electrode 20 is provided on the second bottom surface 24 in a state of being separated from the second terminal electrode 18 by a predetermined interval, and is provided so as to extend from the second bottom surface 24 to a part of each of the plurality of surfaces adjacent thereto. The third terminal electrode 19 has a third main surface 27 extending along the first bottom surface 23. The fourth terminal electrode 20 has a fourth main surface 28 extending along the second bottom surface 24.

Figure 4:
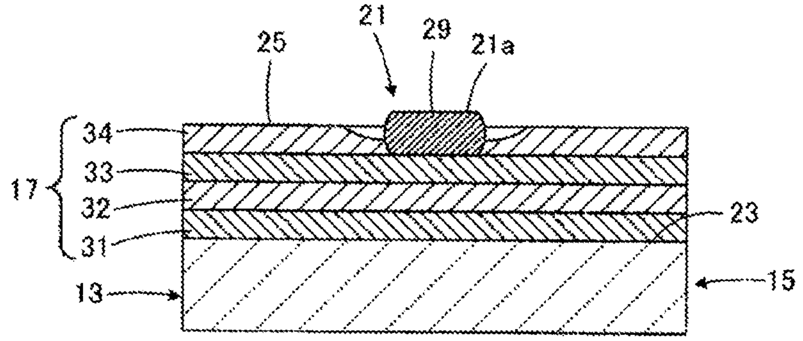
FIG. 4 is an enlarged view schematically showing a part of a section taken along line S-S in FIG. 1.

FIG. 4 shows an enlarged sectional structure of a portion positioned so as to cover the first bottom surface 23 of the first terminal electrode 17. It should be noted that regarding the sectional structure, the second terminal electrode 18, the third terminal electrode 19, and the fourth terminal electrode 20 are substantially similar to the first terminal electrode 17. Therefore, hereinafter, the sectional structure of the first terminal electrode 17 will be described in detail, and the description of the sectional structure of each of the second terminal electrode 18, the third terminal electrode 19, and the fourth terminal electrode 20 will be omitted.

The first terminal electrode 17 includes a baked electrode layer 31 positioned on the first bottom surface 23 of the first flange portion 13 and formed by baking a conductive paste containing, for example, silver as a conductive component, a copper-containing layer 32 formed on the baked electrode layer 31 by wet plating and made of copper or a copper alloy, a nickel-containing layer 33 formed on the copper-containing layer 32 by wet plating and made of nickel or a nickel alloy, and a tin-containing layer 34 formed on the nickel-containing layer 33 by wet plating and made of tin or a tin alloy. The copper-containing layer 32 formed by wet plating mainly provides good conductivity, the nickel-containing layer 33 formed by wet plating mainly provides solder resistance, and the tin-containing layer 34 formed by wet plating mainly has good connectivity with solder and provides affinity for solder.

It should be noted that not only the copper-containing layer 32 but also the baked electrode layer 31 provides good conductivity. Therefore, any one of the copper-containing layer 32 and the baked electrode layer 31 may be omitted. In addition, the copper-containing layer 32, the nickel-containing layer 33, and the tin-containing layer 34 may be formed by a method other than wet plating.

Although not shown, in the portion provided on the part of each of the plurality of surfaces adjacent to the first bottom surface 23 in the first terminal electrode 17, for example, a nickel-chromium layer and a nickel-copper layer on the nickel-chromium layer each of which is formed by dry plating such as sputtering are provided as a base material, and on the nickel-chromium layer and the nickel-copper layer, the above-described copper-containing layer 32, nickel-containing layer 33, and tin-containing layer 34 extend from the first bottom surface 23.

FIG. 4 shows a state in which the first terminal 21*a* of the core wire 29 of the first wire 21 is connected to the first terminal electrode 17. In this connection, thermocompression bonding is applied. In a thermocompression bonding step, the first wire 21 is disposed on the first terminal electrode 17, and in this state, the first wire 21 is pushed toward the first terminal electrode 17 by a heater chip (not shown). As a result, the insulating coating film 30 (see FIG. 3) of the first wire 21 is melted or decomposed, and at least a part of the first terminal 21*a* of the core wire 29 is exposed. At the same time, at least a part of the first terminal 21*a* of the core wire 29 is embedded in the first terminal electrode 17, more specifically, in the tin-containing layer 34 until the first terminal 21*a* comes into contact with the nickel-containing layer 33 while being crushed so that the section of the first terminal 21*a* is flat. In this manner, the first terminal 21*a* of the first wire 21 is electrically connected to the first terminal electrode 17.

Figure 5:
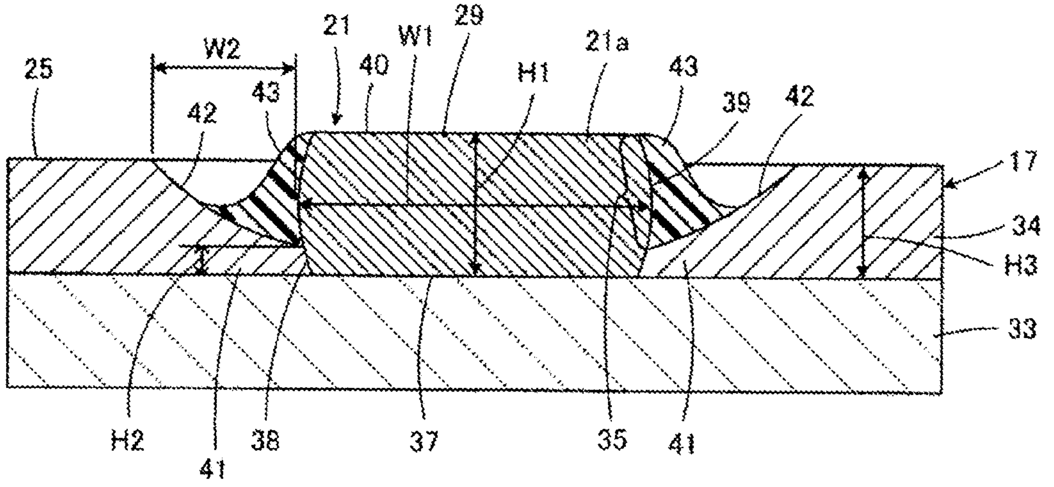
FIG. 5 is a view schematically showing a further enlarged portion of a portion shown in FIG. 4.

In FIG. 5, a part of the portion shown in FIG. 4 is further enlarged and shown. As a result of the first terminal 21*a* of the core wire 29 of the first wire 21 being crushed so as to have a flat section by thermocompression bonding, the first terminal 21*a* has a contact surface 37 in contact with the nickel-containing layer 33, a pair of side surfaces 38 and 39 adjacent to the contact surface 37 and extending in a direction rising from the nickel-containing layer 33, and a flat top surface 40 adjacent to the side surfaces 38 and 39 and facing the contact surface 37.

Hereinafter, a direction connecting the contact surface 37 and the top surface 40 is defined as a height direction, and a direction connecting the pair of side surfaces 38 and 39 is defined as a width direction.

It is assumed that the core wire 29 having a diameter of, for example, 30 μm is used as the first wire 21. In this case, as a result of thermocompression bonding, a dimension W1 in the width direction of the first terminal 21*a* of the core wire 29 crushed so as to have a flat section is about 40 μm, that is, shows an increase rate of about +33%. On the other hand, a dimension H1 in the height direction of the first terminal 21*a* of the core wire 29 is about 15 μm, that is, shows a decrease rate of about −50%.

In addition, as shown in FIG. 5, the side surfaces 38 and 39 of the first terminal 21*a* have a region 35 not in contact with the tin-containing layer 34 at least on the top surface 40 side. More specifically, the tin-containing layer 34 forms a fillet 41 whose dimension in the height direction gradually decreases toward each of the pair of side surfaces 38 and 39 of the first terminal 21*a*. In this embodiment, the fillet 41 is in contact with each bottom end portion as shown of the side surfaces 38 and 39 of the first terminal 21*a*. Preferably, the region where the fillet 41 is in contact with the side surfaces 38 and 39 of the first terminal 21*a* is set to be ½ or less of the dimension in the height direction of the side surfaces 38 and 39.

With the configuration as described above, diffusion of copper into the tin-containing layer 34 does not occur in the region 35 not in contact with at least the tin-containing layer 34 in the first terminal 21*a* of the core wire 29. Therefore, inconvenience such as the core wire 29 being thinned can be made less likely to occur. On the other hand, since the tin-containing surface by the tin-containing layer 34 having high affinity for solder exists around the first terminal 21*a* of the first terminal electrode 17, good connectivity of the coil component 11 to a mounting substrate can be maintained.

In addition, since providing the fillet 41 reduces unevenness with reference to the first main surface 25 of the first terminal electrode 17, spreading out of solder paste at the time of mounting the coil component 11 is less likely to be inhibited, and the attitude of the coil component 11 can be less likely to be destabilized.

As illustrated in FIG. 5, a surface of fillet 41 facing outward forms a curved surface protruding downward, that is, concave curved surface 42. In FIG. 5, a molten and solidified material 43 is illustrated in a space defined by the concave curved surface 42 and each of the side surfaces 38 and 39 of the first terminal 21*a*. The molten and solidified material 43 is a resin lump derived from the resin constituting the insulating coating film 30 of the first wire 21, and is generated by melting the insulating coating film 30 at the time of thermocompression bonding and remaining and solidifying at least a part of the melt in the space. It should be noted that in FIG. 4 and FIG. 6 described below, the illustration of the molten and solidified material 43 is omitted.

The generation of the molten and solidified material 43 described above has the following effects. At the time of thermocompression bonding, as described above, the insulating coating film 30 is melted, and the tin-containing layer 34 is also melted at a portion in contact with the first wire 21 and in the vicinity thereof. At this time, as a thermocompression bonding condition, it is preferable that the temperature is relatively low but that the pressure is relatively high. As a result, tin or a tin alloy constituting the tin-containing layer 34 is melted at the portion in contact with the first wire 21 and in the vicinity thereof, while is pushed away by the molten and solidified material 43 generated by melting the insulating coating film 30. Then, the side surfaces 38 and 39 of the first terminal 21*a* have the region 35 not in contact with the tin-containing layer 34 at least on the top surface 40 side, and the tin-containing layer 34 forms the fillet 41 in which the dimension in the height direction gradually decreases toward each of the pair of side surfaces 38 and 39 of the first terminal 21*a*.

It should be noted that although the insulating coating film 30 is melted to generate the molten and solidified material 43, not all the molten resin generated by melting the insulating coating film 30 becomes the molten and solidified material 43, but part of the molten resin may be decomposed and vaporized.

In addition, the top surface 40 of the first terminal 21*a* is normally exposed to the outside, but the molten and solidified material of the insulating coating film 30 may slightly remain on a part of the top surface 40.

The embodiment shown in FIG. 5 further has the following features.

A dimension H2 in the height direction of the region where the fillet 41 is in contact with the side surfaces 38 and 39 of the first terminal 21*a* is ½ or less of the dimension W1 in the width direction of the first terminal 21*a*. Thus, even when copper is somewhat consumed by the tin-containing layer 34 on the side surfaces 38 and 39 of the first terminal 21*a*, the reliability of the electrical connection between the first terminal 21*a* and the nickel-containing layer 33 can be maintained.

In addition, a dimension H3 in the height direction of a portion excluding the fillet 41 of the tin-containing layer 34 is smaller than the dimension H1 in the height direction of the first terminal 21*a*. Thus, it is easy to further reduce the dimension H2 in the height direction of the region where the fillet 41 is in contact with the side surfaces 38 and 39 of the first terminal 21*a*, that is, to further widen the region 35 where the side surfaces 38 and 39 of the first terminal 21*a* are not in contact with the tin-containing layer 34.

In addition, a dimension W2 in the width direction of an interval between the portion excluding the fillet 41 of the tin-containing layer 34 and the first terminal 21*a* is smaller than the dimension W1 in the width direction of the first terminal 21*a*. Since this further reduces unevenness with reference to the first main surface 25 of the first terminal electrode 17, spreading out of solder paste at the time of mounting the coil component 11 is further less likely to be inhibited, and the attitude of the coil component 11 can be further less likely to be destabilized.

Figure 6:
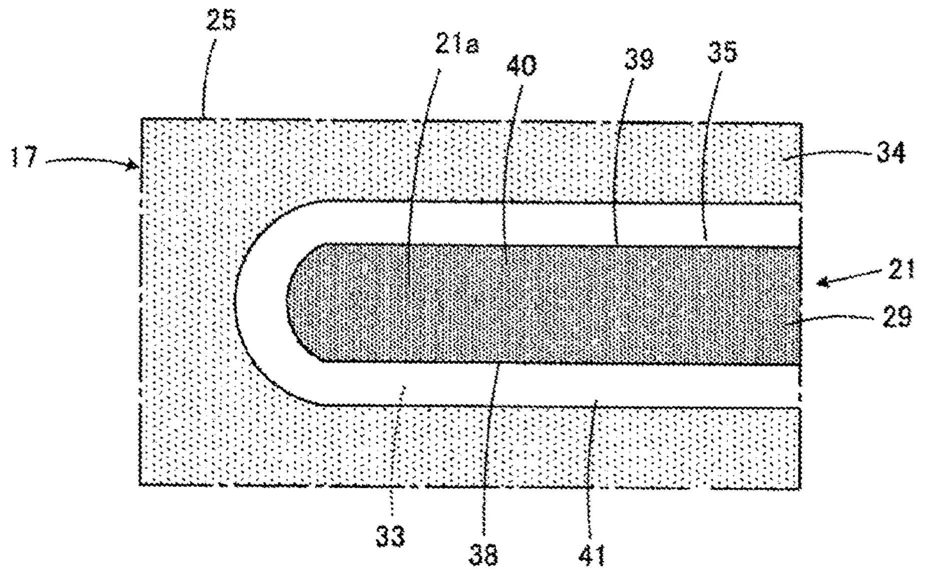
FIG. 6 is a view schematically showing the portion shown in FIG. 4 from above.

In addition, as shown in FIG. 6, the region 35 (in FIG. 6, a part of a region indicated by a white background) where the first terminal 21*a* is not in contact with the tin-containing layer 34 is located along the whole contour of the first terminal 21*a* located over the nickel-containing layer 33 when viewed from a direction orthogonal to the first bottom surface 23 of the first flange portion 13.

Thus, diffusion of copper into the tin-containing layer 34 is less likely to occur in the whole contour of the first terminal 21*a*, and inconvenience such as thinning of the core wire 29 can be more reliably less likely to occur. In addition, since the tin-containing surface by the tin-containing layer 34 having high affinity for solder exists around the first terminal 21*a* of the first terminal electrode 17, high connectivity of the coil component 11 to the mounting substrate can be more reliably maintained.

Figure 7:
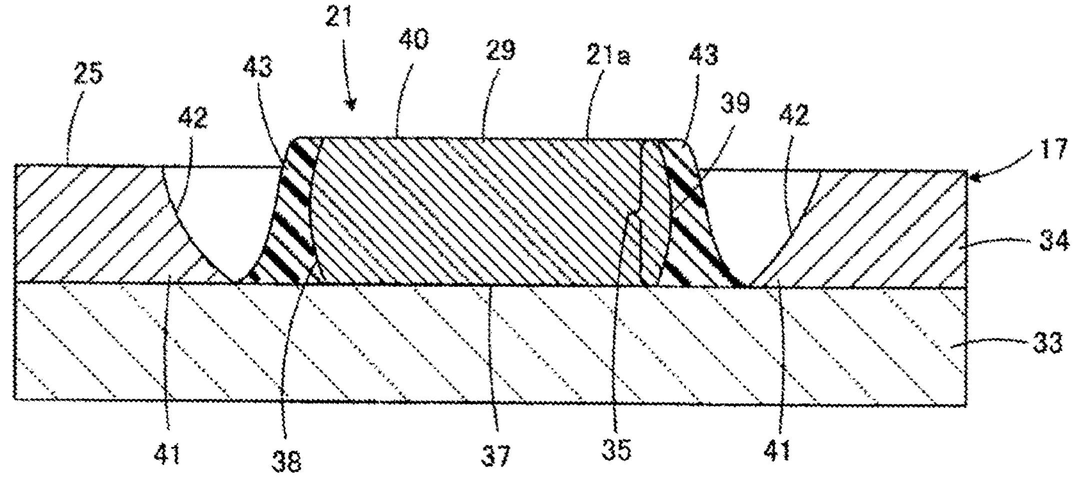
FIG. 7 is a view corresponding to FIG. 5 for illustrating a second embodiment of the present disclosure.

A second embodiment of the present disclosure will be described with reference to FIG. 7. FIG. 7 is a diagram corresponding to FIG. 5. In FIG. 7, elements corresponding to the elements shown in FIG. 5 are denoted by the same reference numerals, and redundant description is omitted.

The embodiment shown in FIG. 7 is characterized in that the fillet 41 is not in contact with the side surfaces 38 and 39 of the first terminal 21*a*, in other words, the whole region of the side surfaces 38 and 39 is the region 35 not in contact with the tin-containing layer 34. This configuration is achieved, for example, as a result that the behavior of the molten and solidified material 43 during thermocompression bonding is different from that of the embodiment shown in FIG. 5. That is, the molten and solidified material 43 generated by melting the insulating coating film 30 at the time of thermocompression bonding is achieved by greatly pushing away the molten tin or tin alloy.

According to this configuration, tin contained in the tin-containing layer 34 does not exist on the whole periphery of the first terminal 21*a*. Therefore, since it is possible to completely prevent copper contained in the first terminal 21*a* from being consumed by the tin-containing layer 34, it is possible to maintain a highly reliable connection state between the first wire 21 and the first terminal electrode 17. In addition, in this configuration, the first terminal 21*a* and the nickel-containing layer 33 are connected to be conductive.

Figure 8:
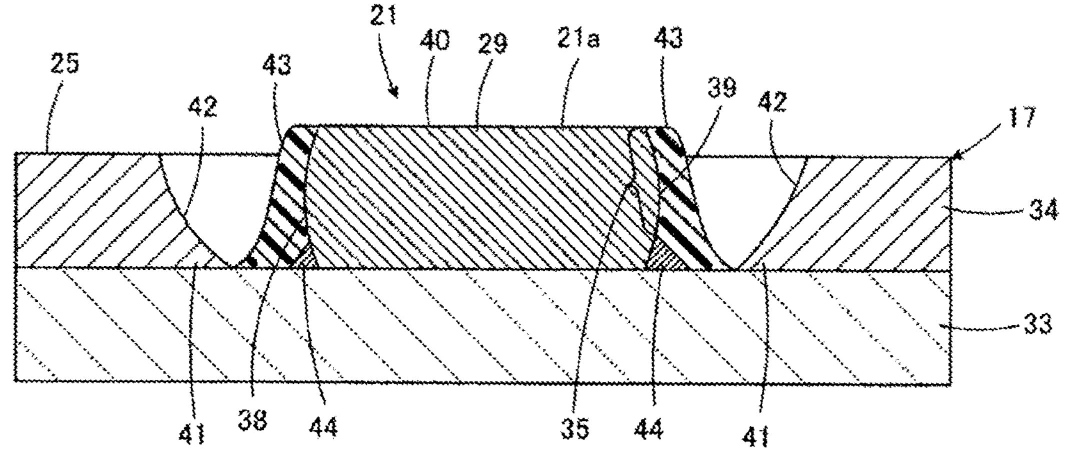
FIG. 8 is a view corresponding to FIG. 5 for illustrating a third embodiment of the present disclosure.
Figure 9:
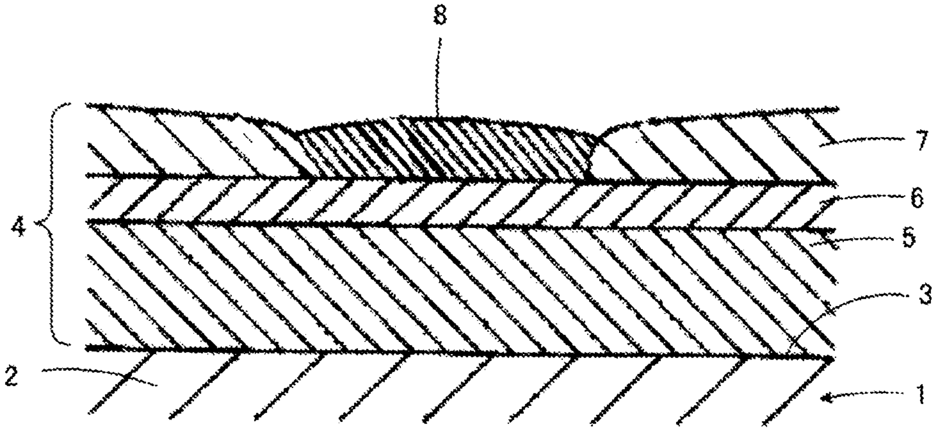
FIG. 9 is cited from Japanese Patent Application Laid-Open No. 10-312922, corresponds to FIG. 1(C) in Japanese Patent Application Laid-Open No. 10-312922, and shows a part of one flange portion 2 included in a core 1.

A third embodiment of the present disclosure will be described with reference to FIG. 8. FIG. 8 is a diagram corresponding to FIG. 5. In FIG. 8, elements corresponding to the elements shown in FIG. 5 are denoted by the same reference numerals, and redundant description is omitted.

The embodiment shown in FIG. 8 is characterized in that the behavior of the molten and solidified material 43 is substantially the same as the behavior of the molten and solidified material 43 shown in FIG. 7, but that there is a residue 44 of the tin-containing layer 34 at the corner defined by each of the side surfaces 38 and 39 of the first terminal 21*a* and the surface of the nickel-containing layer 33. In the embodiment shown in FIG. 8, as in the embodiment shown in FIG. 7, the fillet 41 is not in contact with the side surfaces 38 and 39 of the first terminal 21*a*, but the residue 44 is slightly in contact with the side surfaces 38 and 39.

According to this configuration, since the residue 44 of the tin-containing layer 34 has little influence on the diffusion of copper contained in the first terminal 21*a*, it is possible to expect substantially the same effect as the case of the embodiment shown in FIG. 7. In addition, in this configuration, the first terminal 21*a* and the nickel-containing layer 33 are connected to be conductive.

It should be noted that the above-described features shown in FIG. 6 are preferably included also in each of the embodiments shown in FIGS. 7 and 8.

The above description with reference to FIGS. 4, 5, 6, 7, and 8 relates to the first terminal electrode 17 and the first terminal 21*a* of the first wire 21. The present disclosure also extends to the case where the characteristic connection structure is applied only to the connection portion between one terminal electrode and one terminal of the wire, but is preferably applied to the connection portion between all the terminal electrodes and the terminals of all the wires connected thereto.

Although the present disclosure has been described above with reference to the illustrated embodiments, various other modifications are possible within the scope of the present disclosure.

For example, in the illustrated embodiments, as illustrated in FIGS. 5, 7, and 8, it has been described that the molten and solidified material 43 is provided, and as a result of the behavior of the molten and solidified material 43 generated from the insulating coating film 30, the side surfaces 38 and 39 of the first terminal 21*a* have the region 35 not in contact with the tin-containing layer 34 at least on the top surface 40 side, but in order to obtain this state, a method other than the method using the molten and solidified material 43 may be applied. For example, in the tin-containing layer, a recess or an opening may be provided in advance in a portion where the terminal of the core wire of the wire is to be disposed, and thermocompression bonding may be performed by disposing the terminal of the core wire in a state of being aligned with the recess or the opening.

In addition, in the above case, a fillet may be formed in advance as with the formation of the recess or the opening.

In addition, although the illustrated embodiments relate to the coil component including two wires, the present disclosure can also be applied to a coil component including one wire or three or more wires. Therefore, the number of terminal electrodes can also be changed according to the number of wires.

In addition, the coil component 11 includes the top plate 16 that connects the pair of flange portions 13 and 14, but instead of this, a coating material may be assigned so as to cover the winding core portion 12 and the wires 21 and 22 on the side opposite to the respective bottom surfaces 23 and 24 of the pair of flange portions 13 and 14. As the coating material, a resin containing magnetic powder is preferably used.

In addition, in the coil component 11, both the top plate 16 and the coating material may be omitted.

In addition, each embodiment described in the present specification is exemplary, and partial replacement, or combination, of configurations is possible between different embodiments.

What is claimed is:

1. A coil component comprising:

a core including a winding core portion extending in an axial direction, and a first flange portion and a second flange portion respectively provided at a first end and a second end opposite to each other in the axial direction of the winding core portion;

a first terminal electrode provided in the first flange portion;

a second terminal electrode provided in the second flange portion; and at least one wire wound around the winding core portion, the at least one wire including a core wire made of copper or a copper alloy and an insulating coating film made of resin covering a peripheral surface of the core wire, wherein the core wire of the wire includes a first terminal electrically connected to the first terminal electrode and a second terminal electrically connected to the second terminal electrode, each of the first flange portion and the second flange portion has a bottom surface facing a mounting surface side, each of the first terminal electrode and the second terminal electrode includes a nickel-containing layer made of nickel or a nickel alloy, the nickel-containing layer being provided to cover the bottom surface of each of the first flange portion and the second flange portion, and a tin-containing layer made of tin or a tin alloy located on the nickel-containing layer, each of the first terminal and the second terminal includes a contact surface in contact with the nickel-containing layer, a pair of side surfaces adjacent to the contact surface, the pair of side surfaces extending in a direction rising from the nickel-containing layer, and a top surface adjacent to the pair of side surfaces, the top surface facing the contact surface, and the pair of side surfaces of at least one of the first terminal and the second terminal has a region out of contact with the tin-containing layer at least on a top surface side.

2. The coil component according to claim 1, wherein when a direction connecting the contact surface and the top surface is a height direction, the tin-containing layer has a fillet in which a dimension in a height direction gradually decreases toward each of the pair of side surfaces of the terminal.

3. The coil component according to claim 2, wherein the fillet is in contact with at least one side surface of the pair of side surfaces of the terminal.

4. The coil component according to claim 3, wherein a region where the fillet is in contact with the side surface of the terminal is ½ or less of a dimension in a height direction of the pair of side surfaces.

5. The coil component according to claim 3, wherein when a direction connecting the pair of side surfaces is a width direction, a dimension in a height direction of a region where the fillet is in contact with the side surface of the terminal is ½ or less of a dimension in a width direction of the terminal.

6. The coil component according to claim 2, wherein the fillet is out of contact with at least one of the pair of side surfaces of the terminal.

7. The coil component according to claim 2, further comprising:

a molten and solidified material derived from the insulating coating film, the molten and solidified material being located on an outer side in a width direction of the side surface of the terminal when a direction connecting the pair of side surfaces is a width direction.

8. The coil component according to claim 2, wherein a dimension in a height direction of a portion excluding the fillet of the tin-containing layer is smaller than a dimension in a height direction of the terminal.

9. The coil component according to claim 1, wherein when a direction connecting the pair of side surfaces is a width direction, a dimension in a width direction of an interval between the terminal and a portion excluding the fillet of the tin-containing layer is smaller than a dimension in a width direction of the terminal.

10. The coil component according to claim 1, wherein a region of the terminal, which is out of contact with the tin-containing layer, is located along a whole contour of the terminal located over the nickel-containing layer when viewed from a direction orthogonal to the bottom surface.

11. The coil component according to claim 4, wherein when a direction connecting the pair of side surfaces is a width direction, a dimension in a height direction of a region where the fillet is in contact with the side surface of the terminal is ½ or less of a dimension in a width direction of the terminal.

12. The coil component according to claim 3, further comprising:

a molten and solidified material derived from the insulating coating film, the molten and solidified material being located on an outer side in a width direction of the side surface of the terminal when a direction connecting the pair of side surfaces is a width direction.

13. The coil component according to claim 4, further comprising:

a molten and solidified material derived from the insulating coating film, the molten and solidified material being located on an outer side in a width direction of the side surface of the terminal when a direction connecting the pair of side surfaces is a width direction.

14. The coil component according to claim 5, further comprising:

a molten and solidified material derived from the insulating coating film, the molten and solidified material being located on an outer side in a width direction of the side surface of the terminal when a direction connecting the pair of side surfaces is a width direction.

15. The coil component according to claim 3, wherein a dimension in a height direction of a portion excluding the fillet of the tin-containing layer is smaller than a dimension in a height direction of the terminal.

16. The coil component according to claim 4, wherein a dimension in a height direction of a portion excluding the fillet of the tin-containing layer is smaller than a dimension in a height direction of the terminal.

17. The coil component according to claim 2, wherein when a direction connecting the pair of side surfaces is a width direction, a dimension in a width direction of an interval between the terminal and a portion excluding the fillet of the tin-containing layer is smaller than a dimension in a width direction of the terminal.

18. The coil component according to claim 3, wherein when a direction connecting the pair of side surfaces is a width direction, a dimension in a width direction of an interval between the terminal and a portion excluding the fillet of the tin-containing layer is smaller than a dimension in a width direction of the terminal.

19. The coil component according to claim 2, wherein a region of the terminal, which is out of contact with the tin-containing layer, is located along a whole contour of the terminal located over the nickel-containing layer when viewed from a direction orthogonal to the bottom surface.

20. The coil component according to claim 3, wherein a region of the terminal, which is out of contact with the tin-containing layer, is located along a whole contour of the terminal located over the nickel-containing layer when viewed from a direction orthogonal to the bottom surface.

* * * * *